(12) United States Patent
Honda et al.

(10) Patent No.: US 8,081,261 B2
(45) Date of Patent: Dec. 20, 2011

(54) DISPLAY SUPPORT APPARATUS

(75) Inventors: Masao Honda, Kato (JP); Takashi Kambe, Kato (JP)

(73) Assignee: Fujitsu Limited, Kawasaki (JP)

( * ) Notice: Subject to any disclaimer, the term of this patent is extended or adjusted under 35 U.S.C. 154(b) by 817 days.

(21) Appl. No.: 12/179,111

(22) Filed: Jul. 24, 2008

(65) Prior Publication Data

US 2008/0278044 A1 Nov. 13, 2008

Related U.S. Application Data

(63) Continuation of application No. PCT/JP2006/300996, filed on Jan. 24, 2006.

(51) Int. Cl.
*H04N 5/64* (2006.01)

(52) U.S. Cl. ............... 348/836; 361/679.08; 361/679.22

(58) Field of Classification Search ............... 348/836, 348/837, 838, 839, 840, 841, 842; 361/679.08, 361/679.22
See application file for complete search history.

(56) References Cited

U.S. PATENT DOCUMENTS

| | | | | |
|---|---|---|---|---|
| 4,762,378 | A * | 8/1988 | Kagami | 361/679.22 |
| 4,989,813 | A * | 2/1991 | Kim et al. | 248/184.1 |
| 6,378,830 | B1 * | 4/2002 | Lu | 248/278.1 |
| 6,392,873 | B1 | 5/2002 | Honda | |
| 6,822,857 | B2 * | 11/2004 | Jung et al. | 361/679.02 |
| 6,850,288 | B2 * | 2/2005 | Kurokawa | 348/836 |
| 7,835,146 | B2 * | 11/2010 | Zhou | 361/679.29 |
| 7,934,689 | B2 * | 5/2011 | Chiu et al. | 248/222.11 |
| 2002/0140875 | A1 * | 10/2002 | Ho | 348/839 |
| 2005/0105257 | A1 | 5/2005 | Shimizu et al. | |
| 2005/0270732 | A1 * | 12/2005 | Titzler et al. | 361/681 |

FOREIGN PATENT DOCUMENTS

| | | |
|---|---|---|
| JP | 3-95586 A | 4/1991 |
| JP | 10-333594 A | 12/1998 |
| JP | 2000-357027 A | 12/2000 |
| JP | 2004-219645 A | 8/2004 |

OTHER PUBLICATIONS

International Search Report of PCT/JP2006/300996, date of mailing Feb. 21, 2006.
Notification of Transmittal of Copies of Translation of the International Preliminary Report on Patentability (Form PCT/IB/338) of International Application No. PCT/JP2006/300996 mailed Aug. 7, 2008 with Forms PCT/IB/373 and PCT/ISA/237.

\* cited by examiner

*Primary Examiner* — Jeanette E Chapman
*Assistant Examiner* — James Buckle, Jr.
(74) *Attorney, Agent, or Firm* — Westerman, Hattori, Daniels & Adrian, LLP

(57) ABSTRACT

It is an object of the present invention to provide a display support apparatus that has a simple structure and can be stored in a small storage space. The display support apparatus includes a main leg 11 that extends downward from a rear face portion of a display, and has a lower end portion provided with an auxiliary leg portion 12 extending forward in a horizontal direction, and a base member 6 that is pivotably coupled to the auxiliary leg portion 12 about a shaft 21. The base member 6 includes a coupling portion 32 that abuts against a bottom face of the auxiliary leg portion 12 in front of the shaft 21, an interlock portion 42 that forms interlocking so that the base member 6 is not pivoted in a state where the coupling portion 32 abuts against the bottom face of the auxiliary leg portion 12.

9 Claims, 7 Drawing Sheets

DISPLAY SUPPORT APPARATUS

TECHNICAL FIELD

The present invention relates to a display support apparatus for supporting a display using a liquid crystal panel or the like.

BACKGROUND ART

Conventionally, various support apparatuses for supporting a thin display using a liquid crystal panel, a plasma display panel, or the like have been proposed that have a so-called tilt mechanism capable of pivoting the display in a vertical plane.

For example, in a support apparatus disclosed in Patent Document 1, a display screen is accommodated in a casing such that the display screen is inclined forward, and the casing is supported by an angle adjustment mechanism such that vertical swing motion of the casing on a pedestal can be adjusted. The angle adjustment mechanism includes a first guide portion that is disposed on one of the casing and the pedestal, on an arc protruding rearward and centered about an axis extending in the horizontal and left-right direction, a second guide portion that is disposed on the other of the casing and the pedestal and can vertically slide with respect to the first guide portion, resisting means for generating a resisting force in a direction in which when the first guide portion and the second guide portion slide with respect to each other, the resisting force hampers the sliding, and support means for keeping the first guide portion and the second guide portion always in contact with each other.

Furthermore, a support apparatus disclosed in Patent Document 2 has a slider that is disposed so as to be movable with respect to a pedestal, an attachment member that is fixed to a rear face of a display and has a lower end axially supported by the slider so as to be pivotable, and a pivot plate that has an upper end movably coupled to the attachment member and a lower end axially supported by the slider so as to be pivotable. The pivot plate and the pedestal are fixed by a thumbscrew.

[Patent Document 1] JP 2000-259085A
[Patent Document 2] JP 2000-200048A

However, both of the conventional display support apparatuses described above have the problem that the production cost is high because the structure is complicated and the number of constituent elements is large.

In particular, in the display support apparatus of Patent Document 1, the casing and the pedestal are tilted. In a case where the display support apparatus is stored, there is the problem that the storage space becomes large because the pedestal projects. In the display support apparatus of Patent Document 2, at the time of storage, the pivot plate slides and the pedestal is positioned along the rear face of the display, but there is still the problem that the number of constituent elements is large and the number of assembling steps is large.

DISCLOSURE OF THE INVENTION

The present invention was made in view of the above-described problems, and it is an object thereof to provide a display support apparatus that has a simple structure and a small number of constituent elements, which is advantageous in cost, and that can be stored in a small storage space.

The present invention is directed to a display support apparatus, including a main leg that extends downward from a rear face portion of a display, and has a lower end portion provided with an auxiliary leg portion extending forward in a horizontal direction; and a base member that is pivotably coupled to the auxiliary leg portion on an axis extending to left and right in the horizontal direction. The base member includes an abutment portion that abuts against a bottom face of the auxiliary leg portion in front of the axis at the time of use, an interlock portion that forms interlocking so that the base member is not pivoted in a state where the abutment portion abuts against the bottom face of the auxiliary leg portion, and a front support portion that abuts against an installation face in front of at least a front end of the auxiliary leg portion at the time of use.

It is preferable that the auxiliary leg portion and the base member are coupled so as to be pivotable, by means of a shaft having its center on the axis that is disposed on one of the auxiliary leg portion and the base member, and a shaft hole that is formed in the other and into which the shaft is inserted, the shaft hole is an elongated hole so that the shaft is movable in a front-rear direction, and interlocking by the interlock portion is canceled by moving the base member forward relative to the auxiliary leg portion.

Furthermore, the base member includes a regulation member that performs regulation so that the base member is not moved forward relative to the auxiliary leg portion at the time of use.

BEST MODE FOR CARRYING OUT THE INVENTION

Figure 1:
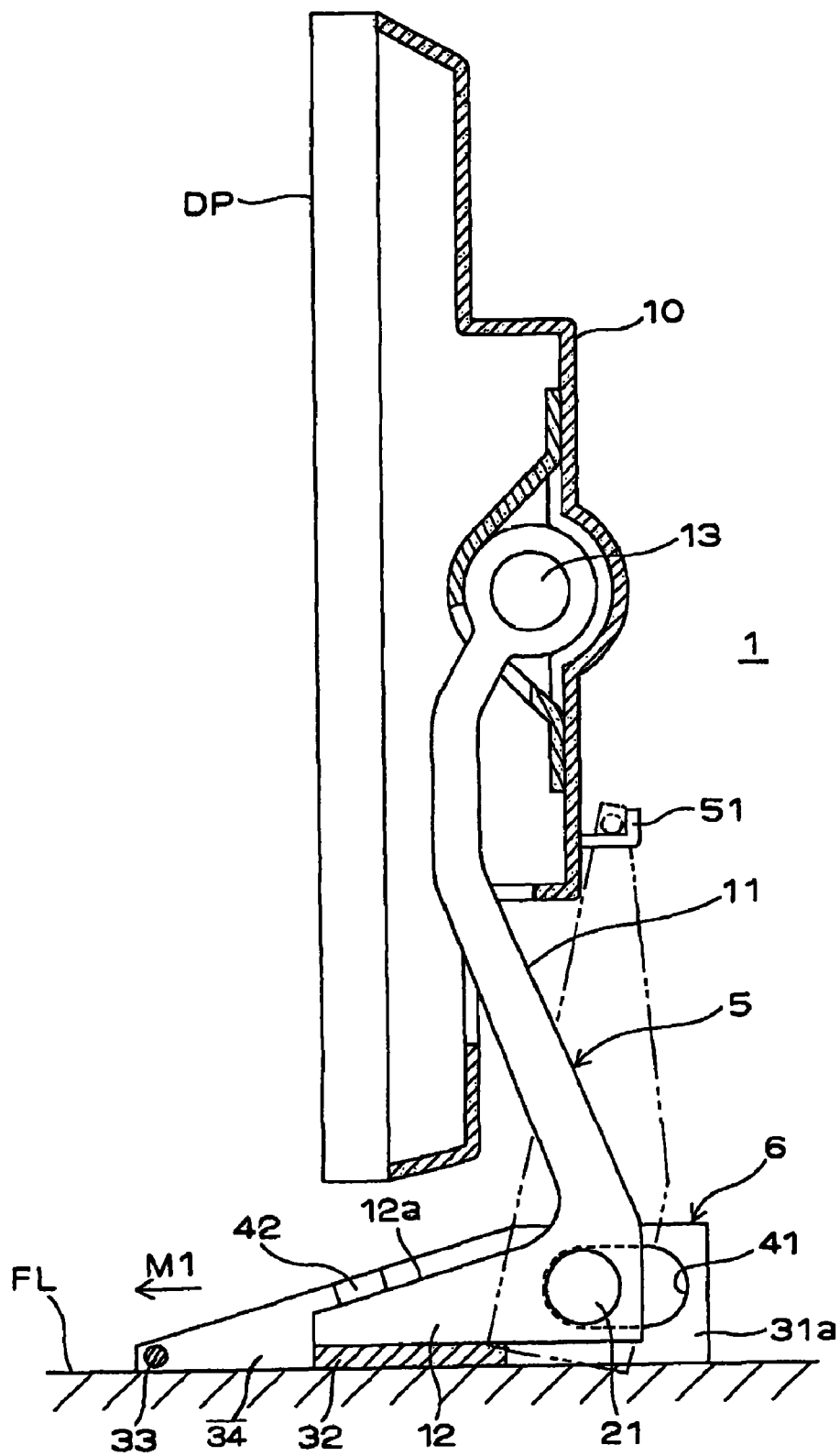
FIG. 1 is a right side view of a cross section of a part of a display support apparatus according to the present invention.
Figure 2:
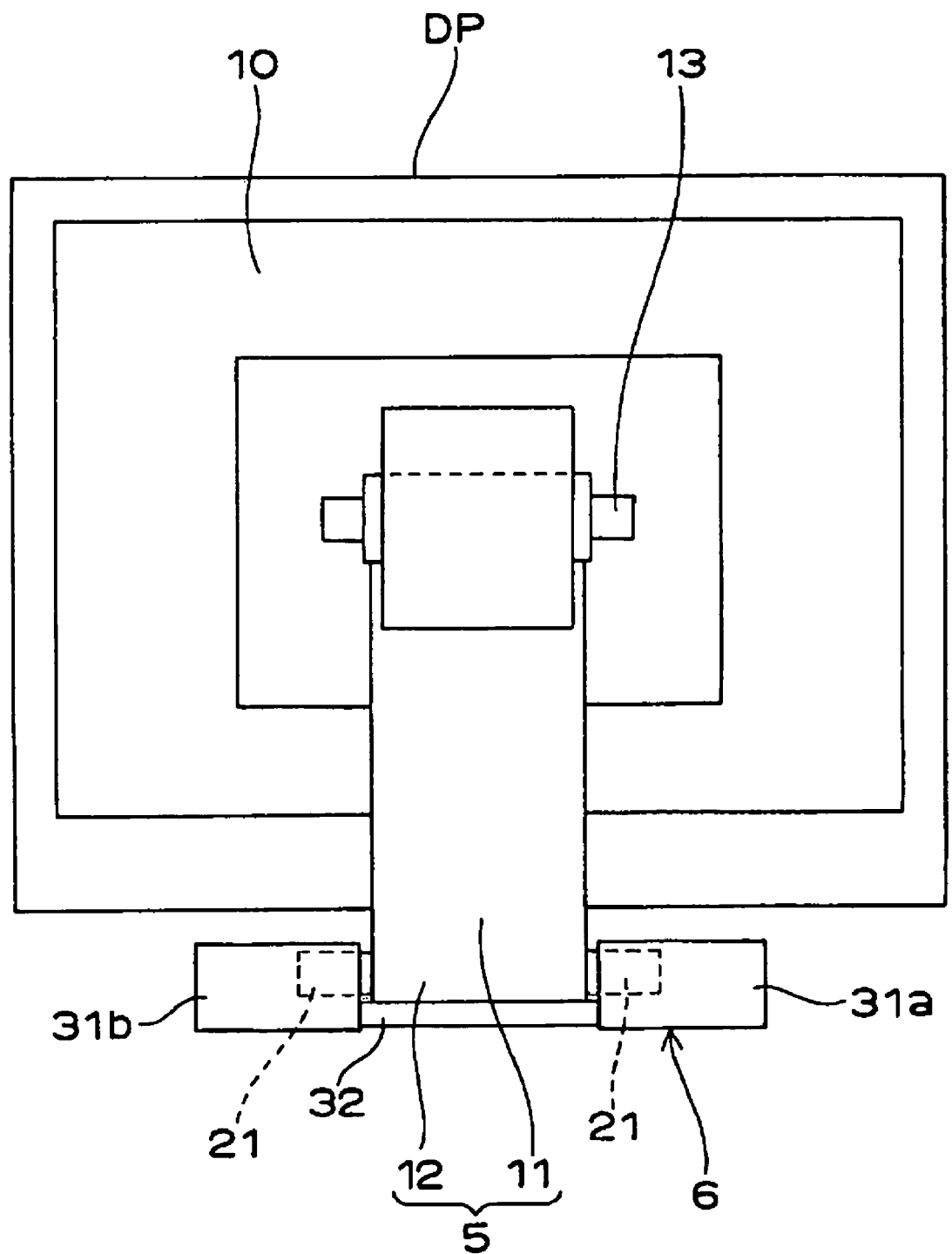
FIG. 2 is a rear face view of the display support apparatus.
Figure 3:
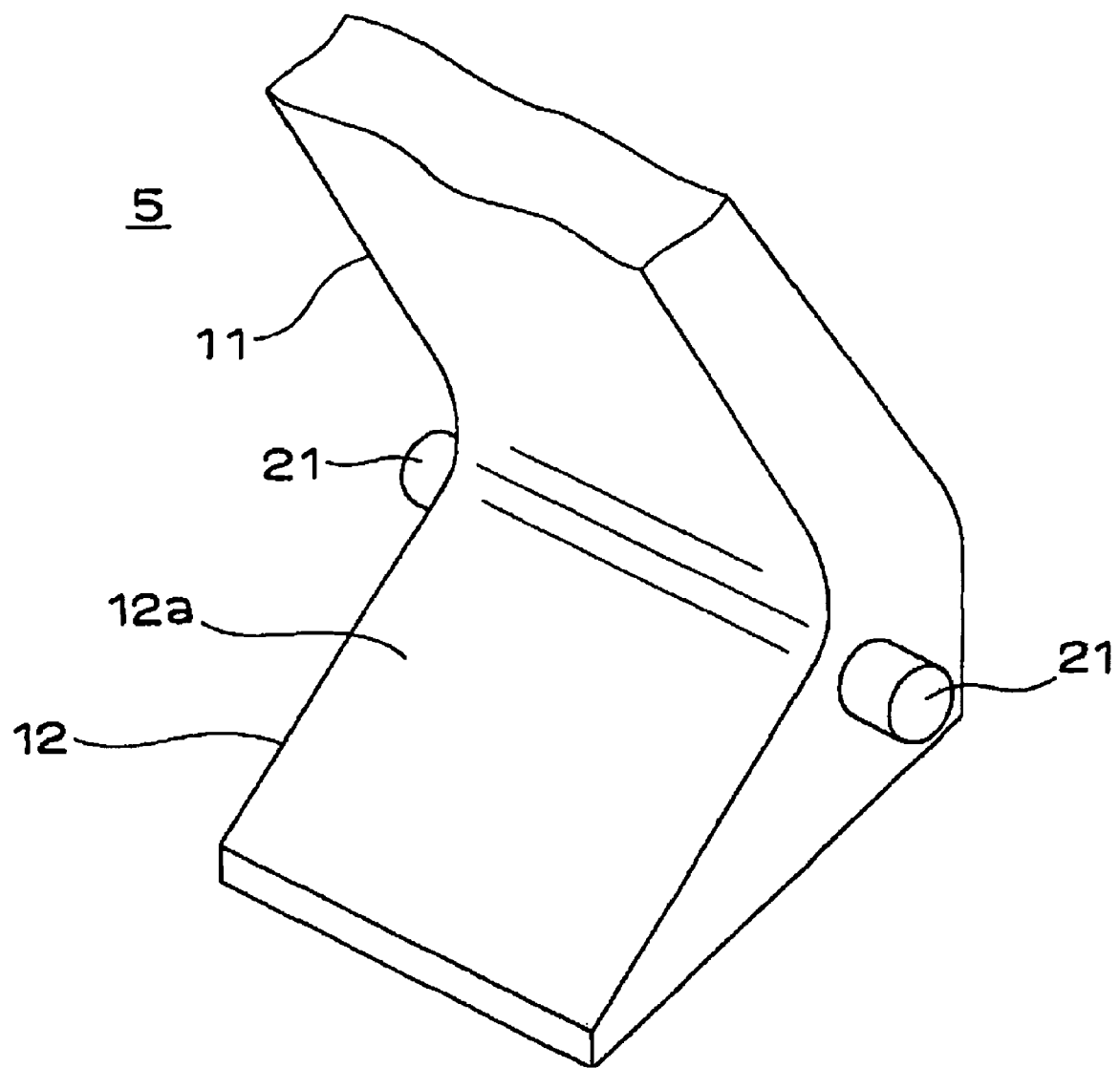
FIG. 3 is a perspective view of a main leg.
Figure 4:
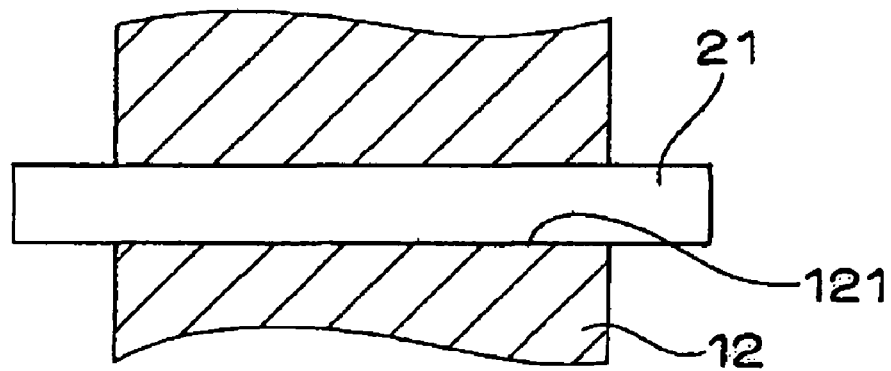
FIG. 4 is a cross-sectional view showing an example of the structure in which an auxiliary leg portion and a shaft are coupled.
Figure 5:
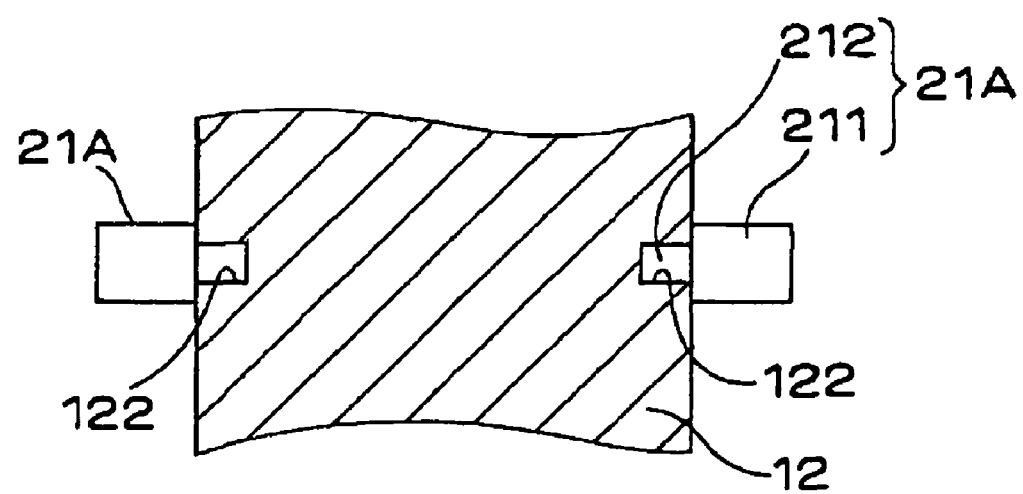
FIG. 5 is a cross-sectional view showing another example of the structure in which the auxiliary leg portion and shafts are coupled.
Figure 6:
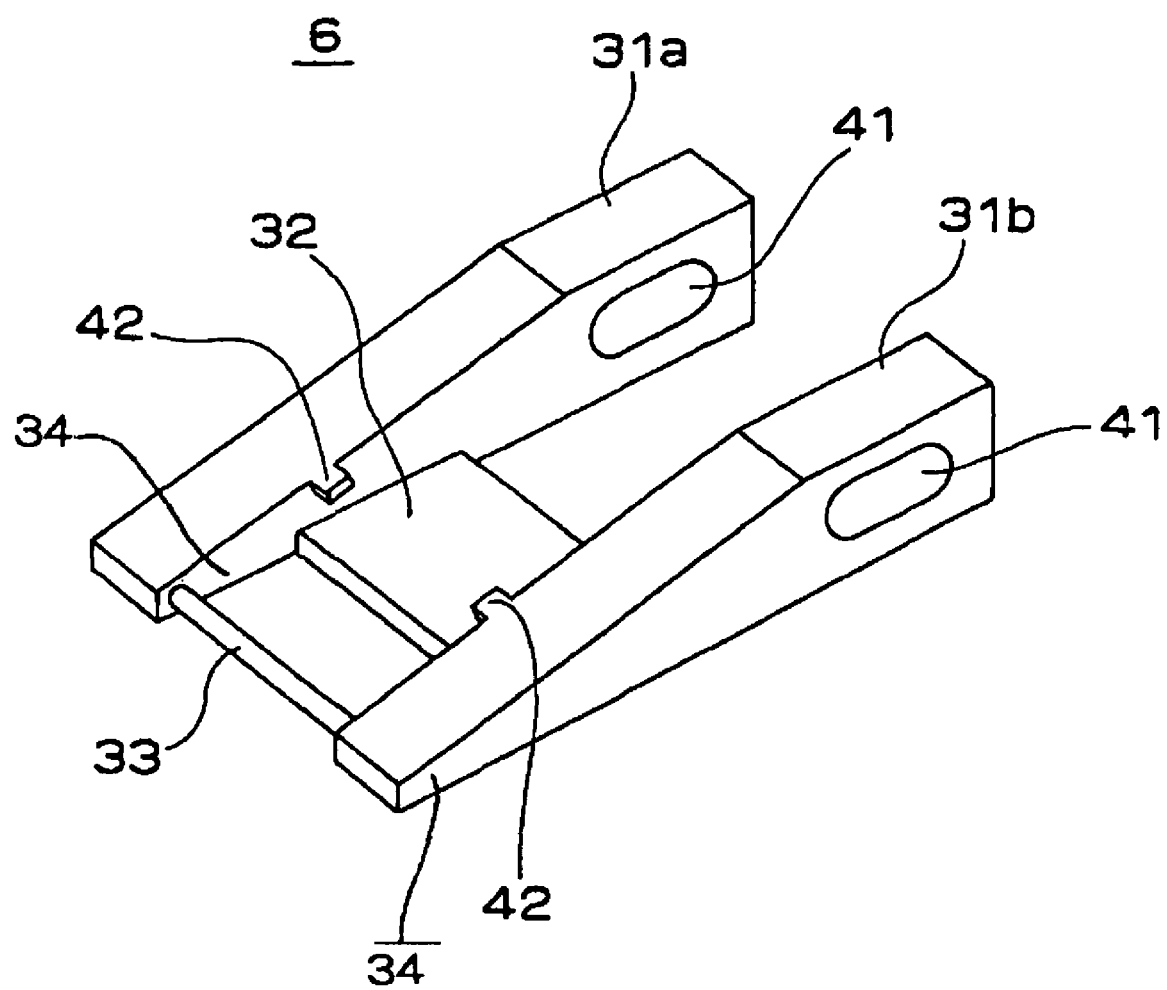
FIG. 6 is a perspective view of a base member.

FIG. 1 is a right side view of a cross section of a part of a display support apparatus 1 according to the present invention. FIG. 2 is a rear face view of the display support apparatus 1. FIG. 3 is a perspective view of a main leg 5. FIG. 4 is a cross-sectional view showing an example of the structure in which an auxiliary leg portion 12 and a shaft 21 are coupled. FIG. 5 is a cross-sectional view showing another example of the structure in which the auxiliary leg portion 12 and shafts 21A are coupled. FIG. 6 is a perspective view of a base member 6.

In FIGS. 1 and 2, the display support apparatus 1 is for supporting a display DP, and has the main leg 5 and the base member 6.

The main leg 5 has a support post portion 11 that extends downward from a rear face portion of the display DP, and the auxiliary leg portion 12 that is disposed so as to be continuous with a lower end portion of the support post portion 11 and extends forward in the horizontal direction. The support post portion 11 is in the shape of a rectangular plate when viewed from the rear as shown in FIG. 2, and extends in the vertical direction so as to be gradually curved when viewed from the side as shown in FIG. 1.

A columnar coupling shaft 13 that projects to the left and right in the horizontal direction is disposed at an upper end portion of the support post portion 11. The coupling shaft 13 is axially supported, so as to be pivotable, by a bearing (not shown) that is disposed in a rear face cover 10 on the rear face portion of the display DP. Accordingly, the display DP is supported so as to be tiltable with respect to the display support apparatus 1.

As clearly shown in FIG. 3, the auxiliary leg portion 12 is substantially in the shape of a rectangle when viewed from above, and has an upper face that is an inclined face 12a lowered in the forward direction. The columnar shaft 21 that extends to the left and right in the horizontal direction is disposed so as to project from both side faces of the auxiliary leg portion 12.

The entire main leg 5 is integrally molded using a synthetic resin. However, for example, the shaft 21 may be separately formed, and coupled to the auxiliary leg portion 12 by assembling.

More specifically, as shown in FIG. 4, the columnar shaft 21 that is longer than the width size of the auxiliary leg portion 12 is formed using a synthetic resin or metal material. A through hole 121 is formed through the auxiliary leg portion 12, and the shaft 21 is inserted through the through hole 121 and fixed using an adhesive, a screw, or the like.

Alternatively, as shown in FIG. 5, the shafts 21A each of which has a columnar portion 211 and a screw portion 212 projecting from the end face of the columnar portion 211 are formed using a synthetic resin or metal material. Screw holes 122 are formed on both side faces of the auxiliary leg portion 12, and the screw portions 212 are respectively screwed into the left and right screw holes 122. Alternatively, columnar protrusions may be arranged instead of the screw portions 212, and the protrusions may be fitted and fixed in the holes on both side faces of the auxiliary leg portion 12. In this case, an adhesive may be used, if necessary.

The base member 6 is constituted by two main base portions 31a and 31b that are arranged in parallel to each other, a coupling portion 32 that couples the two main base portions 31a and 31b, a front end bar portion 33, and the like.

The two main base portions 31a and 31b have substantially the same shape, and have an outline that is similar to and larger than that of the auxiliary leg portion 12 when viewed from the side. Shaft holes 41 that are elongated holes are respectively formed in the rear end portions of the main base portions 31a and 31b.

The shaft 21 that is disposed in the main leg 5 is inserted through the shaft holes 41. Accordingly, the base member 6 is coupled so as to be pivotable about the shaft 21. In other words, the main leg 5 and the base member 6 are coupled together by the shaft 21 and are capable of relatively rotating on an axis corresponding to the center of the shaft 21. Furthermore, since the shaft holes 41 are elongated holes, the base member 6 is not only pivotable, but also movable slightly in the longitudinal direction.

An interlock portion 42 that is flush with the upper face of each of the main base portions 31a and 31b and projecting inward is disposed on the inner side face of each of the main base portions 31a and 31b. In a state where the display support apparatus 1 is used, the interlock portions 42 abut against the inclined face 12a of the auxiliary leg portion 12 and interlock the auxiliary leg portion 12 such that the base member 6 is not pivoted. The interlock portions 42 correspond to projecting portions in the present invention.

The coupling portion 32 is in the shape of a rectangular plate when viewed from above, and disposed in front of the shaft 21. In a state where the display support apparatus 1 is used, a bottom face of the auxiliary leg portion 12 abuts against the upper face of the coupling portion 32. The coupling portion 32 or its upper face corresponds to an abutment portion in the present invention.

The front end bar portion 33 is in the shape of a round bar, and disposed so as to couple front end portions of the two main base portions 31a and 31b.

In a state where the display support apparatus 1 is used, as shown in FIG. 1, the bottom face of the auxiliary leg portion 12 abuts against the upper face of the coupling portion 32, the inclined face 12a of the auxiliary leg portion 12 abuts against the interlock portions 42, and the shaft 21 is placed in the shaft holes 41. Thus, the base member 6 is not pivoted with respect to the main leg 5. In this state, bottom faces of the main base portions 31a and 31b of the base member 6 abut against an installation face FL. Front end portions 34 of the main base portions 31a and 31b abut against the installation face FL in front of the front end of the auxiliary leg portion 12. Accordingly, the display DP is sufficiently stably supported so as not to topple forward. The front end portions 34 of the main base portions 31a and 31b correspond to front support portions in the present invention.

In this manner, the size in length and width of the main base portions 31a and 31b is set large in such a manner that the display DP can be stably supported.

The entire base member 6 can be integrally molded using a synthetic resin. However, for example, the front end bar portion 33 may be separately formed using a metal material and attached later. Furthermore, the coupling portion 32 may be separately formed using a synthetic resin or metal material, and attached later so that the entire base member 6 is assembled.

The position of the base member 6 shown in FIG. 1 is a use position. As described above, at the use position, the front end portion of the base member 6 is positioned sufficiently front, and stably supports the display DP. The base member 6 can be positioned at a storage position that enables the display support apparatus 1 to be stored in a smaller storage space, as described next.

More specifically, from the state shown in FIG. 1, the entire display DP is slightly lifted, and the base member 6 is moved by being pulled by the hand forward (in the direction indicated by arrow M1) with respect to the main leg 5. Accordingly, the interlock portions 42 are removed from the inclined face 12a, and interlocking by the interlock portions 42 is canceled. Thus, the base member 6 can be pivoted counterclockwise in FIG. 1. Then, the base member 6 can be positioned substantially directly above the shaft 21, by pivoting the base member 6 by approximately 270 degrees. This position is the storage position. It should be noted that the position and the size of the coupling portion 32 are set such that the base member 6 can be pivoted without interference with the main leg 5.

In a state where the display support apparatus 1 is stored, the front end portion of the base member 6 is not in front of the display DP, and the base member 6 is positioned substantially along the rear face cover 10. Thus, the entire storage space of the display DP and the display support apparatus 1 can be made small.

Thus, when the display DP is not used, the display DP can be placed in a small space such as a corner of a desk, by positioning the base member 6 at the storage position. Furthermore, during shipment or transportation of the display DP, the volume becomes small. Accordingly, the amount of packing materials used when packing the display DP becomes small, and the cost can be lowered.

Furthermore, the display support apparatus 1 of this embodiment is advantageous in cost, because it does not have a complicated folding structure as in conventional examples, but has a simple structure, and the number of constituent elements is small.

Note that in a stored state, the front end bar portion 33 of the base member 6 may be inserted from above and hooked on a hook 51 that is disposed on the rear face cover 10 or another appropriate member. Thus, the front end bar portion 33 corresponds to an engagement portion for keeping the storage position in the present invention.

Next, modified examples of the display support apparatus 1 will be described.

In the display support apparatus 1 of the foregoing embodiment, in a state where the auxiliary leg portion 12 is inserted into the gap between the coupling portion 32 and the interlock portions 42, a drop-prevention effect is to some extent achieved due to the wedge action by the inclined face 12a of the auxiliary leg portion 12. However, in order to ensure the drop-prevention, a structure as described next also may be adopted.

Figure 7:
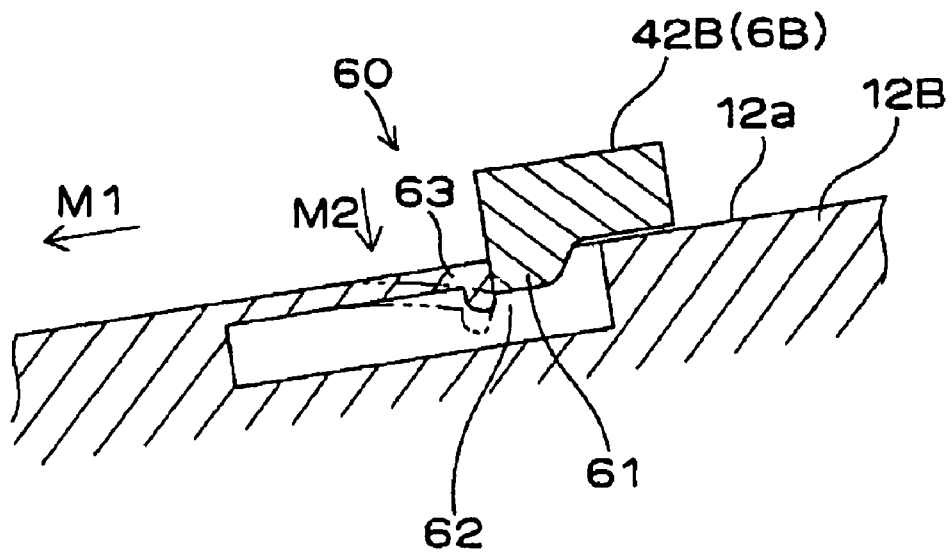
FIG. 7 is a cross-sectional view showing the main portions of a base member and an auxiliary leg portion that are provided with a regulation member.
Figure 8:
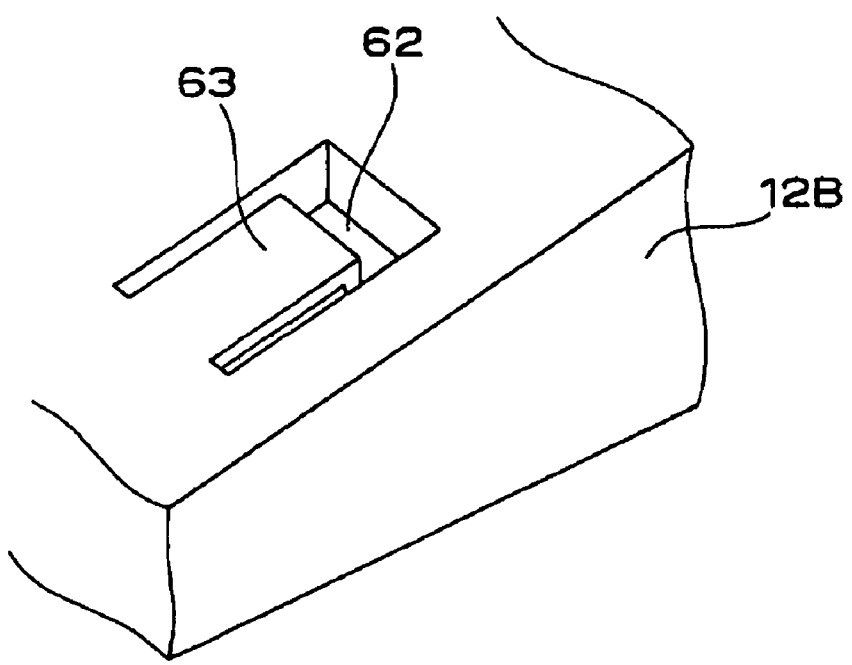
FIG. 8 is a perspective view of a portion of the regulation member that is provided in the auxiliary leg portion.

FIG. 7 is a cross-sectional view showing the main portions of a base member 6B and an auxiliary leg portion 12B that are provided with a regulation member 60 for drop-prevention. FIG. 8 is a perspective view of a portion of the regulation member 60 that is provided in the auxiliary leg portion 12B.

In FIGS. 7 and 8, the base member 6B and the auxiliary leg portion 12B are provided with the regulation member 60 that performs regulation so that the base member 6B is not moved forward (in the direction indicated by arrow M1) with respect to the auxiliary leg portion 12B at the time of use.

The regulation member 60 is constituted by a catch portion 61 that projects downward at an interlock portion 42B, and an engagement groove 62 that is disposed at a portion of the auxiliary leg portion 12B abutting against the catch portion 61 and engaged with the catch portion 61. A flexible interlock piece 63 that extends in the shape of a plate from a part of the auxiliary leg portion 12B is disposed in a recess portion that is disposed at the inclined face 12a of the auxiliary leg portion 12B, and thus the engagement groove 62 is formed.

More specifically, in a state where the catch portion 61 is fitted into the engagement groove 62, the catch portion 61 abuts against a front end portion of the interlock piece 63. Accordingly, forward movement of the base member 6B is regulated. If the interlock piece 63 is pressed by the finger from above into the direction indicated by arrow M2, the interlock piece 63 is warped as indicated by the chain line in FIG. 7, and interlocking between the catch portion 61 and the interlock piece 63 is canceled.

In the display support apparatus 1 of the foregoing embodiment, the front end bar portion 33 is hooked on the hook 51 in order to keep the base member 6 at the storage position. Alternatively, a structure as described next also may be adopted.

Figure 9:
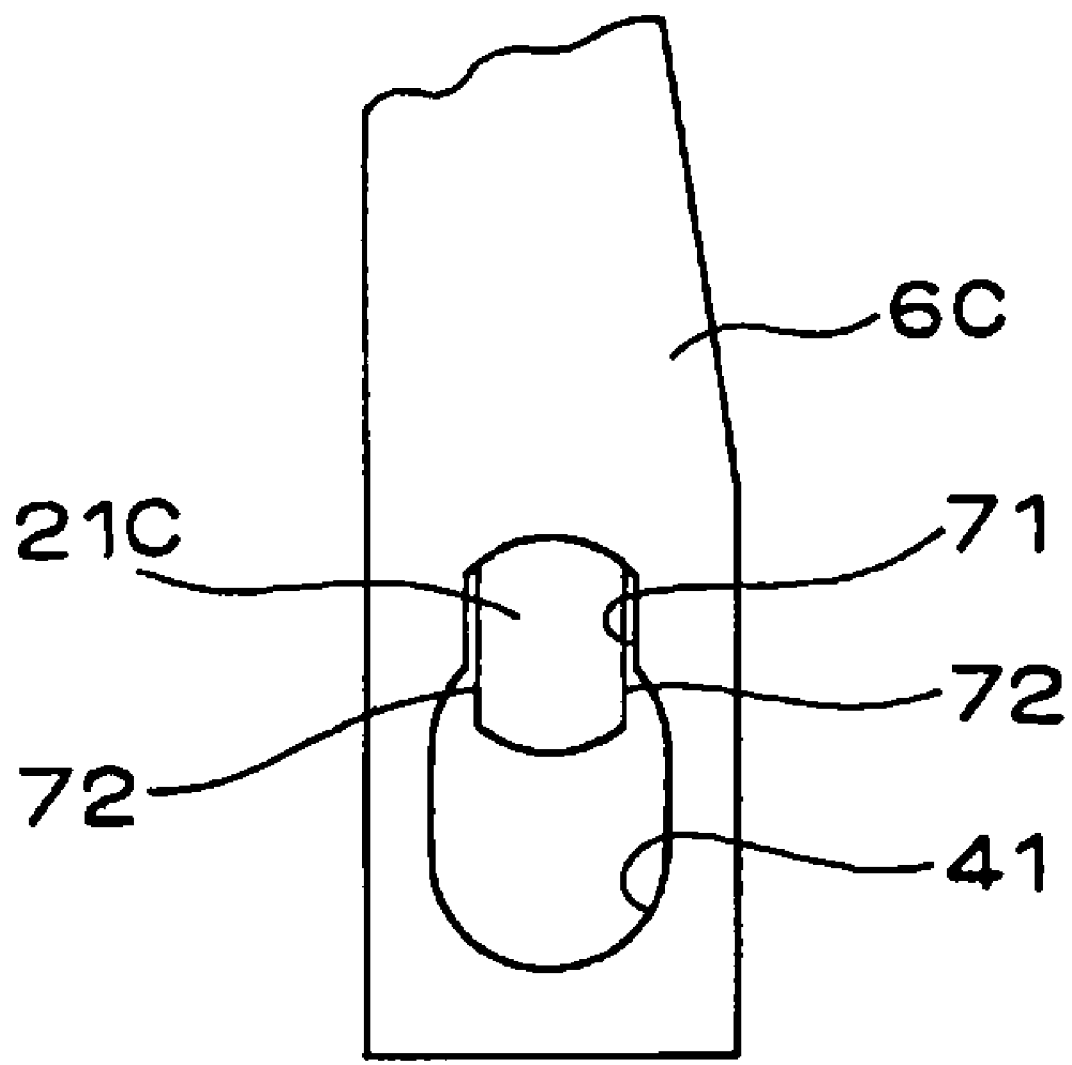
FIG. 9 is a view showing another example of an engagement portion for keeping the storage position of a base member.

FIG. 9 is a view showing another example of the engagement portion for keeping the storage position of a base member 6C.

In FIG. 9, an engagement hole 71 that is continuous with the shaft hole 41 is formed in the base member 6C. The width size of the engagement hole 71 is smaller than that of the shaft hole 41. A shaft 21C that is disposed in the main leg 5 has two faces 72 forming the width across flats. In a state where the base member 6C is positioned at the storage position, the two faces 72 forming the width across flats are fitted into the engagement hole 71. Thus, the base member 6C cannot be pivoted with respect to the shaft 21C. Accordingly, the storage position of the base member 6C is kept.

Thus, the engagement hole 71 and the two faces 72 forming the width across flats in FIG. 9 correspond to engagement portions in the present invention.

In the foregoing embodiment, the auxiliary leg portion 12 may be provided with shaft holes instead of the shaft 21, and shaft pins inserted from the outer side faces of the main base portions 31a and 31b may be fitted into the shaft holes. Also, instead of the interlock piece 63 shown in FIG. 8, a large number of linear grooves may be provided on the surface of the interlock piece 63, and interlocking at the optimum position may be realized by fitting the front end of the catch portion 61 into the grooves.

In the foregoing embodiment, the upper face of the auxiliary leg portion 12 was the inclined face 12a, but it may be not the inclined face 12a, but a face parallel to the bottom face. More specifically, the overall shape of the auxiliary leg portion 12 may be not a wedge, but a rectangular solid. A disk-like cushion made of a synthetic rubber or the like may be attached to the bottom faces of the main base portions 31a and 31b. In this case, the cushion positioned frontmost in the main base portions 31a and 31b functions as a front support portion in the present invention. Various other structures may be adopted as the structure in which the coupling shaft 13 of the main leg 5 and the display DP are coupled.

In addition to the above, the structure, the shape, the size, the number of pieces, the material, and the like of the main leg 5, the base member 6, or all or each constituent element of the display support apparatus 1 may be changed as appropriate according to the gist of the present invention.

The invention claimed is:

1. A display support apparatus for supporting a display, comprising:
 a main leg that extends downward from a rear face portion of the display, and has a lower end portion provided with an auxiliary leg portion extending forward in a horizontal direction; and
 a base member that is pivotably coupled to the auxiliary leg portion on an axis extending to left and right in the horizontal direction,
 the base member including:
  an abutment portion that abuts against a bottom face of the auxiliary leg portion in front of the axis at a time of use;
  an interlock portion that forms interlocking so that the base member is not pivoted in a state where the abutment portion abuts against the bottom face of the auxiliary leg portion; and
  a front support portion that abuts against an installation face in front of at least a front end of the auxiliary leg portion at the time of use.

2. The display support apparatus according to claim 1,
 wherein the auxiliary leg portion and the base member are coupled so as to be pivotable, by means of a shaft having its center on the axis that is disposed on one of the auxiliary leg portion and the base member, and a shaft hole that is formed in the other and into which the shaft is inserted,
 the shaft hole is an elongated hole so that the shaft is movable in a front-rear direction, and
 interlocking by the interlock portion is canceled by moving the base member forward relative to the auxiliary leg portion.

3. The display support apparatus according to claim 2, wherein the base member includes a regulation member that performs regulation so that the base member is not moved forward relative to the auxiliary leg portion at the time of use.

4. The display support apparatus according to claim 1,
wherein the base member is pivotable from a use position at which the abutment portion abuts against the bottom face of the auxiliary leg portion to a storage position at which the abutment portion is positioned substantially directly above the axis, and
the base member includes an engagement portion for keeping the storage position.

5. The display support apparatus according to claim 2,
wherein the base member has two main base portions that are positioned on both left and right sides of the auxiliary leg portion, and a coupling portion that couples the two main base portions, and
the coupling portion has an upper face functioning as the abutment portion.

6. The display support apparatus according to claim 5, wherein the interlock portion is constituted by projecting portions that project inward in a left-right direction from the main base portions, and a portion of the auxiliary leg portion abutting against the projecting portions.

7. The display support apparatus according to claim 6,
wherein the auxiliary leg portion has an upper face that is an inclined face lowered in a forward direction, and
the inclined face functions as the portion of the auxiliary leg portion abutting against the projecting portions.

8. The display support apparatus according to claim 6, wherein the regulation member is constituted by a catch portion that projects downward at the projecting portions, and an engagement groove that is disposed at the portion of the auxiliary leg portion abutting against the projecting portion and engaged with the catch portions.

9. The display support apparatus according to claim 1, wherein each of the main leg and the base member is integrally molded using a synthetic resin.

* * * * *